(12) United States Patent
Choi (10) Patent No.: US 8,949,015 B2
(45) Date of Patent: Feb. 3, 2015

(54) APPARATUS AND METHOD FOR PREVENTING COLLISION BETWEEN VESSELS

(75) Inventor: You-Hee Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/601,435

(22) Filed: Aug. 31, 2012

(65) Prior Publication Data

US 2013/0238232 A1    Sep. 12, 2013

(30) Foreign Application Priority Data

Mar. 12, 2012    (KR) .................. 10-2012-0025070

(51) Int. Cl.
  *G08G 1/16*    (2006.01)
  *G06G 7/78*    (2006.01)
(52) U.S. Cl.
  USPC ........................................ 701/301
(58) Field of Classification Search
  CPC .......... G05D 1/206; B63B 49/00; G06G 7/78; B60W 30/09; B60W 30/0953
  USPC ............. 701/21, 23, 300–302; 340/903, 3.41; 398/36
  See application file for complete search history.

(56) References Cited

U.S. PATENT DOCUMENTS 4,313,115 A * 1/1982 O'Sullivan ............... 342/41
2011/0144912 A1   6/2011 Lee et al.

FOREIGN PATENT DOCUMENTS

KR    10-2011-0009983 A    1/2011
KR    10-2011-0066010 A    6/2011

* cited by examiner

Primary Examiner — Mary Cheung
(74) Attorney, Agent, or Firm — Rabin & Berdo, P.C.

(57) ABSTRACT

Disclosed herein are an apparatus and method for preventing a collision between vessels. The apparatus includes a position information processing unit, an expected collision route calculation unit, an escape route calculation unit, and a control unit. The position information processing unit collects information about the position of a reference vessel using a mobile terminal and receives information about a counterpart vessel from a user. The expected collision route calculation unit calculates an expected collision route based on the information. The escape route calculation unit calculates escape routes if the possibility of a collision is above a set value. The control unit provides the escape routes, compares changes in actually measured positions of the vessels with the escape routes, and manages navigation on the results of the comparison between changes in the actually measured positions of the vessels and the escape routes.

10 Claims, 5 Drawing Sheets

[INPUT INFORMATION ABOUT COUNTERPART VESSEL]

POSITION OF COUNTERPART VESSEL :

( STERN STEM ) ( PORT STARBOARD ) [   ] DEGREES

DISTANCE TO COUNTERPART VESSEL : [   ] MILES

SPEED OF COUNTERPART VESSEL(PREDICTION) : [   ] KNOTS

SIZE OF COUNTERPART VESSEL (PREDICTION) : [   ] TONS ( OK )

APPARATUS AND METHOD FOR PREVENTING COLLISION BETWEEN VESSELS

CROSS REFERENCE TO RELATED APPLICATION

This application claims the benefit of Korean Patent Application No. 10-2012-0025070, filed on Mar. 12, 2012, which is hereby incorporated by reference in its entirety into this application.

BACKGROUND OF THE INVENTION

1. Technical Field

The present invention relates generally to an apparatus and method for preventing a collision between vessels and, more particularly, to an apparatus and method which collect information about a counterpart vessel based on a reference vessel, predict the possibility of a collision with the counterpart vessel, and calculate an escape route after taking into consideration the relationship of an encounter with the counterpart vessel, thereby preventing a collision between the vessels.

2. Description of the Related Art

According to the current marine accident statistics, there is a tendency for marine accidents to increase annually. One of the most common types of marine accidents is a collision. Statistics reveal that most of the collisions are related to ships of less than 100 tons and also related to collisions between non-fishing boats and fishing boats and between fishing boats.

In order to prevent a collision with another vessel, the counterpart vessel must be detected, the danger of a collision must be determined by continuously monitoring the movement of the counterpart vessel via a cross-check process performed in conjunction with the counterpart vessel using a Very High Frequency (VHF) radio, an appropriate escape operation must be instituted based on the results of the determination, and the counterpart vessel also must cooperate in carrying out the appropriate escape operation.

Unlike a large-sized vessel, a small-sized vessel, such as a fishing boat subject to frequent collisions, is not commonly equipped with a detection device for detecting other vessels, for example, a radar or an Automatic Identification System (AIS). Furthermore, even if such a detection device is mounted on a small-sized vessel, the device has limited functionality. Accordingly, collisions frequently occur because the crews of small-sized vessels cannot predict collisions using radars because of the crews being not well aware of a radar floating method, or because the crews are short of a professional navigation skill or are not well acquainted with navigation regulations.

Furthermore, it was found that when collisions occurred, counterpart vessels were not detected even immediately before the collisions. It was also found that even though counterpart vessels were detected, the distances between the vessels that could be detected by the naked eye was commonly 2 to 5 miles, which corresponds to a few minutes before a collision.

In a conventional method of preventing a collision between vessels, information about vessels adjacent to a reference vessel is collected using an external device, a collision is predicted based on information about the position and speed of the reference vessel, and an alarm warning of the collision is issued based on the prediction. Furthermore, in the conventional method of preventing a collision between vessels, a collision prevention route that should be taken by the reference vessel is provided or the steering device of the reference vessel is automatically controlled in order to avoid a collision without taking into consideration navigation regulations based on the relationship of an encounter between the reference vessel and the counterpart vessel.

However, the prevention of a collision between vessels requires a cooperative operation, and the vessels should obey navigation regulations when performing cooperative escape. Therefore, escape operations that should be taken by both vessels having the possibility of a collision are different depending on the condition in which both the vessels encounter each other. Furthermore, if several vessels are navigating, a change in the navigation route of one vessel may affect other vessels, and thus other vessels adjacent to the vessel need to know about the change.

For this purpose, in the conventional method, the prevention of collisions between vessels is performed using a VHF radio. However, there is a problem with communication because multinational vessels are navigating on the sea.

As described above, it is difficult in the conventional method of preventing a collision between vessels to discuss information about navigation and a method of escape because there is a problem with communication. Furthermore, the conventional method is problematic in that a reference vessel cannot conduct communication via a designated frequency because of the disruption of a VHF radio when the reference vessel encounters several vessels on a route with heavy traffic.

SUMMARY OF THE INVENTION

Accordingly, the present invention has been made keeping in mind the above problems occurring in the prior art, and an object of the present invention is to provide an apparatus and method which collect information about a counterpart vessel based on a reference vessel, predict the possibility of a collision with the counterpart vessel, and calculate an escape route after taking into consideration the relationship of an encounter with the counterpart vessel, thereby preventing a collision between the vessels.

In order to achieve the above object, the present invention provides a method of preventing a collision between vessels, including collecting information about the position of a reference vessel using a mobile terminal on the reference vessel; receiving information about a counterpart vessel from a user on the reference vessel via the mobile terminal; calculating an expected collision route based on the information about the position of the reference vessel and the information about the counterpart vessel; calculating escape routes capable of preventing a collision between the vessels if a possibility of a collision corresponding to the expected collision route is above a set value; providing the escape routes via mobile terminals on the vessels and comparing changes in actually measured positions of the vessels with the escape routes; and managing navigation of the vessels based on results of the comparison between the changes in the actually measured positions of the vessels and the escape routes.

The calculating the expected collision route may include extracting an expected collision point where the collision is expected to occur based on the information about the position of the reference vessel and the information about the position of the counterpart vessel; and calculating the expected collision routes based on the expected collision point.

The receiving the information about the counterpart vessel may include obtaining the information about the counterpart vessel using an identification device of the reference vessel capable of identifying the counterpart vessel; and receiving the obtained information from the user on the reference vessel via the mobile terminal The information about the counterpart vessel may include at least one of a position of the counterpart vessel, a distance to the counterpart vessel, the speed of the counterpart vessel, and the size of the counterpart vessel.

The calculating the escape routes may include determining whether the reference vessel is a give-way vessel that must perform an escape operation or a stand-on vessel that must maintain a course and speed pursuant to a predetermined rule; and calculating the escape routes based on results of the determination.

The method may further include providing the escape routes to the mobile terminals on the vessels; determining whether at least one of the vessels provided with the escape route is a give-way vessel or a stand-on vessel if a change in route is not approved by the at least one of the vessels; and calculating an alternative escape route, replacing the escape route, based on results of the determination.

In order to achieve the above object, the present invention provides an apparatus for preventing a collision between vessels, including a position information processing unit for collecting information about the position of a reference vessel using a mobile terminal on the reference vessel and receiving information about a counterpart vessel from a user on the reference vessel via the mobile terminal; an expected collision route calculation unit for calculating an expected collision route based on the information about the position of the reference vessel and the information about the counterpart vessel; an escape route calculation unit for calculating escape routes capable of preventing a collision between the vessels if a possibility of a collision corresponding to the expected collision route is above a set value; and a control unit for providing the escape routes via mobile terminals on the vessels, comparing changes in actually measured positions of the vessels with the escape routes, and managing navigation of the vessels based on results of the comparison between changes in the actually measured positions of the vessels and the escape routes.

The expected collision route calculation unit may extract an expected collision point where the collision is expected based on the information about the position of the reference vessel and the information about the position of the counterpart vessel, and calculate the expected collision route based on the expected collision point if the information about the position of the reference vessel is identical with the information about the counterpart vessel.

The position information processing unit may receive the information about the counterpart vessel which is obtained by using an identification device located on the reference vessel, from the user on the reference vessel via the mobile terminal.

The information about the counterpart vessel may include at least one of a position of the counterpart vessel, a distance to the counterpart vessel, the speed of the counterpart vessel, and the size of the counterpart vessel.

The escape route calculation unit may determine whether the reference vessel is a give-way vessel that must perform an escape operation or a stand-on vessel that must maintain a course and speed pursuant to a predetermined rule, and calculate the escape routes based on results of the determination.

The control unit may provide the escape routes to the mobile terminals on the vessels; and, if a change in route is not approved by at least one of the vessels provided with the escape routes, the escape route calculation unit may determine whether the at least one vessel is a give-way vessel or a stand-on vessel, and calculate an alternative escape route, replacing the escape route, based on results of the determination.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described below in detail with reference to the accompanying drawings. Here, repetitive descriptions and detailed descriptions of well-known functions or configurations which would unnecessarily obscure the gist of the present invention will be omitted. Embodiments of the present invention are provided to complete the explanation for those skilled in the art of the present invention. Therefore, the shapes and sizes of components in the drawings may be exaggerated to provide more precise descriptions.

An apparatus and method for preventing a collision between vessels according to embodiments of the present invention will now be described in detail with reference to the accompanying drawings.

Figure 1:
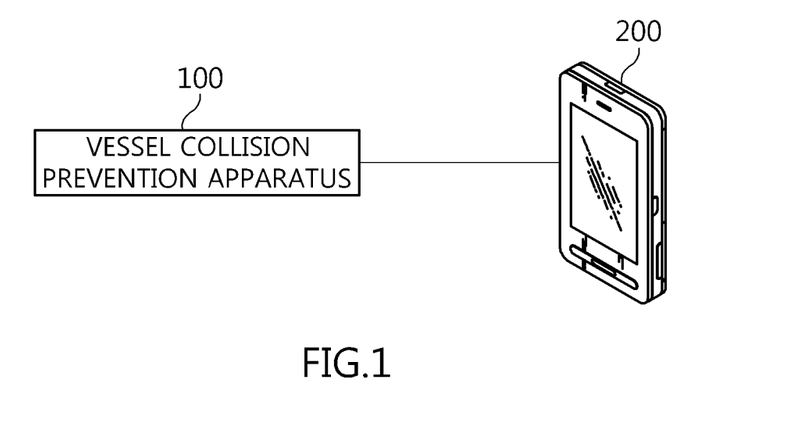
FIG. 1 is a diagram schematically showing an environment to which an apparatus for preventing a collision between vessels according to an embodiment of the present invention has been applied.
Figure 2:
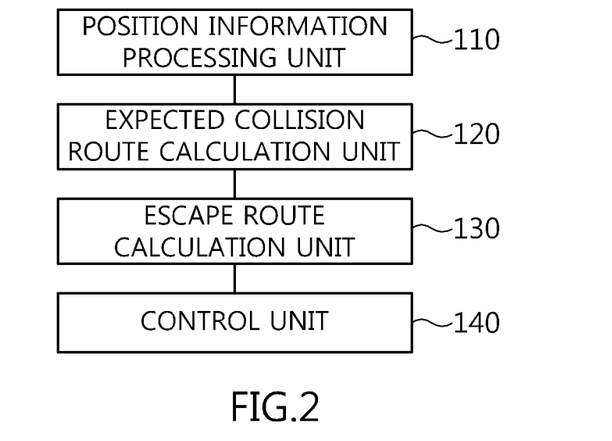
FIG. 2 is a diagram showing the configuration of the apparatus for preventing a collision between vessels according to an embodiment of the present invention.

FIG. 1 is a diagram schematically showing an environment to which the apparatus for preventing a collision between vessels according to an embodiment of the present invention has been applied. FIG. 2 is a diagram showing the configuration of the apparatus for preventing a collision between vessels according to the embodiment of the present invention.

Referring to FIG. 1, the apparatus for preventing a collision between vessels (hereinafter referred to as the "vessel collision prevention apparatus") 100 according to the embodiment of the present invention is located on land, and prevents a collision between vessels on the sea while operating in conjunction with a mobile terminal 200 that is carried by a crew member of a vessel on the sea.

Referring to FIG. 2, the vessel collision prevention apparatus 100 includes a position information processing unit 110, an expected collision route calculation unit 120, an escape route calculation unit 130, and a control unit 140.

The position information processing unit 110 collects information about the position of a vessel, corresponding to the mobile terminal 200 accessing the vessel collision prevention apparatus 100, using the GPS information of the mobile terminal 200. Thereafter, the position information processing unit 110 extracts a point where a collision is expected, that is, an expected collision point, based on information about the position of a counterpart vessel input by the user of the mobile terminal 200 corresponding to a reference vessel, and information about the positions of vessels obtained by the position information processing unit 110, and searches for an expected collision vessel located within a set radius around the extracted expected collision point. Here, the reference vessel corresponds to a vessel that has requested a vessel collision prevention service from the vessel collision prevention apparatus 100 via the mobile terminal 200 in order to prevent a collision with the counterpart vessel.

Furthermore, the position information processing unit 110 receives information about the position of the reference vessel, actually measured before the reference vessel passes through the expected collision point, from the mobile terminal 200, and transfers the information to the escape route calculation unit 130.

The expected collision route calculation unit 120 calculates an expected collision route based on the information about the position of the reference vessel and the information about the position of the counterpart vessel. Here, the expected collision route calculation unit 120 calculates the possibility of a collision occurring between the reference vessel and the counterpart vessel, that is, the possibility of the collision, based on the expected collision route.

If an escape route has been set for each vessel, the expected collision route calculation unit 120 predicts an expected collision route in real time based on information about the position of the vessel over time before the vessel passes an expected collision point, and checks whether the vessels adhere to the escape routes based on the predicted expected collision route.

The escape route calculation unit 130 primarily calculates a primary escape route based on the rank of each vessel in navigation according to the Sea Traffic Safety Act or the International Regulations for Avoiding Collisions at Sea based on the expected collision route. Furthermore, the escape route calculation unit 130 calculates a secondary escape route based on information about the size and speed of each of the reference vessel and the counterpart vessel and the exceptional situations of the Sea Traffic Safety Act or the International Regulations for Avoiding Collisions at Sea, corresponding to individual situations, if cooperative escape based on the primary escape route is not achievable because of various situations, such as the loss of communication between the vessels and a denial of the approval of the primary escape route.

The control unit 140 provides an escape route to a mobile terminal corresponding to each of the vessels, compares a change in the actually measured position of the vessel with the escape route, and manages the vessels in order to prevent a collision between the vessels based on the results of the comparison and information about the expected collision point.

A method of preventing a collision between vessels on the sea while operating in conjunction with a mobile terminal on each vessel will now be described in detail with reference to FIG. 3.

Figure 3:
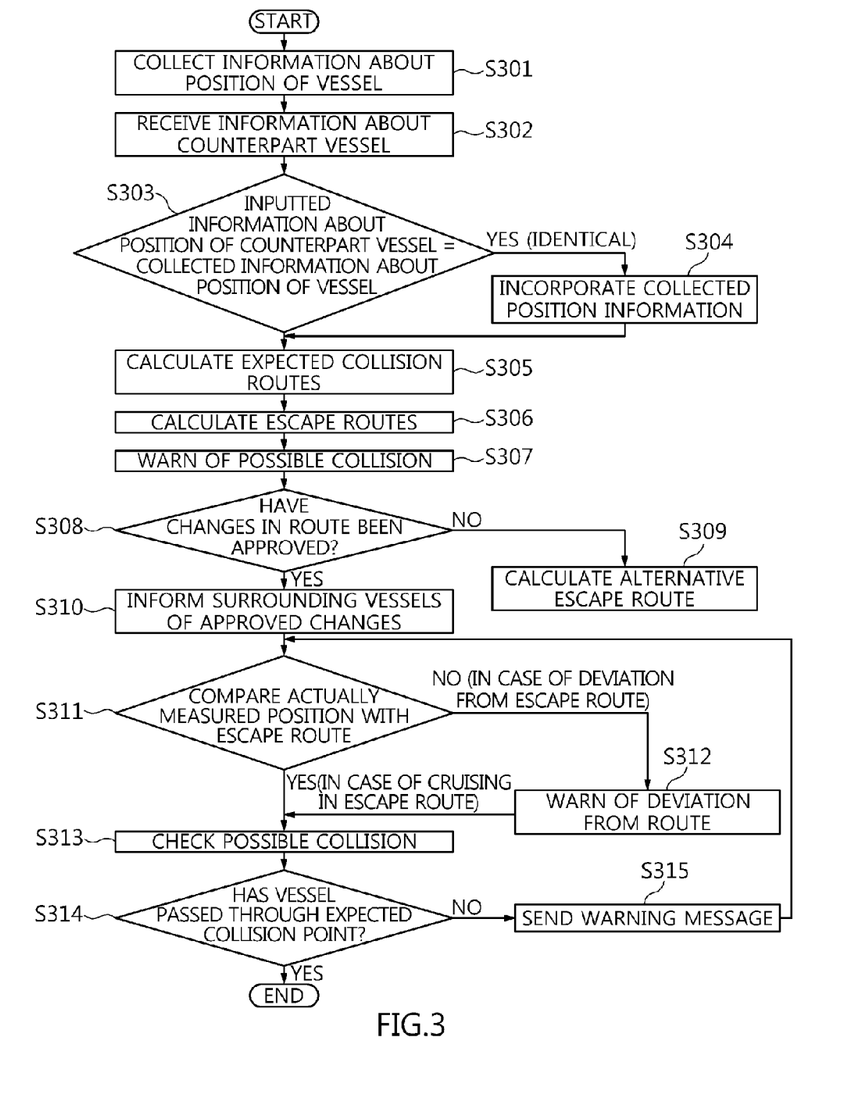
FIG. 3 is a flowchart illustrating a method of preventing a collision between vessels according to an embodiment of the present invention.
Figure 4:
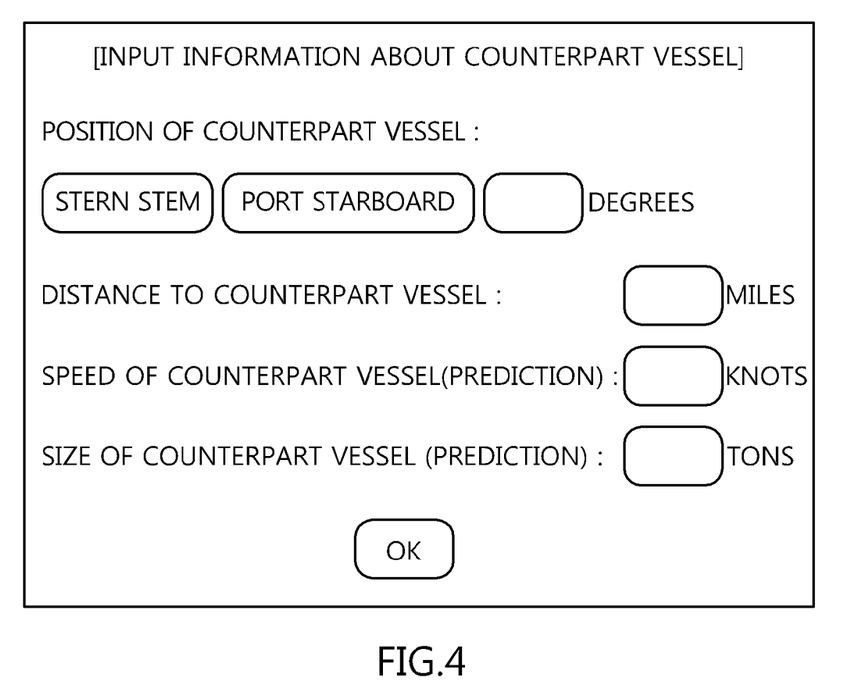
FIGS. 4 to 6 are diagrams showing the screens of a mobile terminal according to an embodiment of the present invention.
Figure 5:
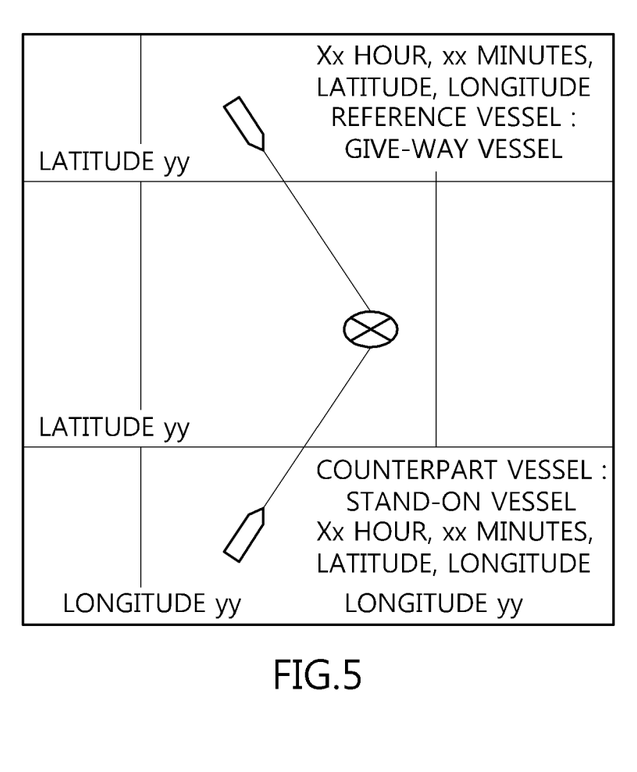
Figure 6:
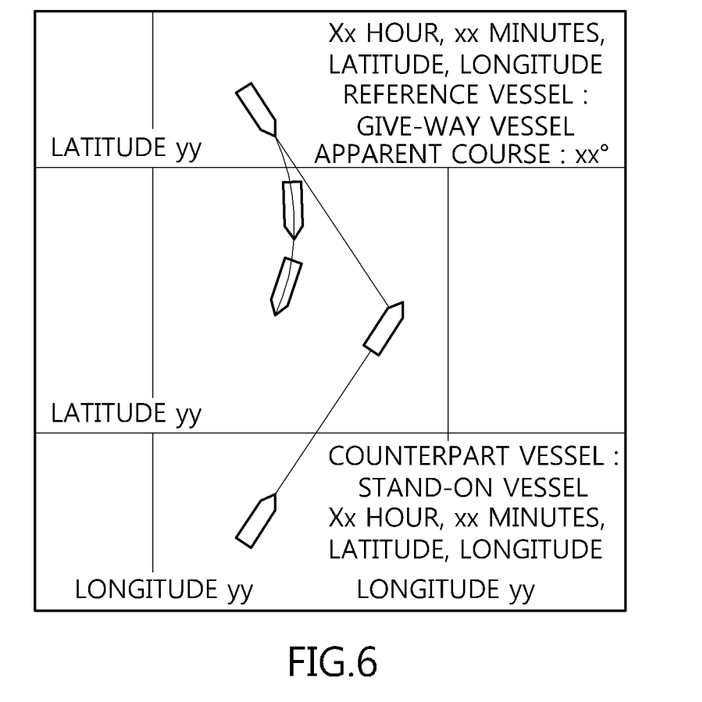

FIG. 3 is a flowchart illustrating the method of preventing a collision between vessels according to an embodiment of the present invention. Furthermore, FIGS. 4 to 6 are diagrams showing the screens of a mobile terminal according to an embodiment of the present invention.

First, the vessel collision prevention apparatus 100 prevents a collision between vessels on the sea while operating in conjunction with the mobile terminal 200 that is carried by a crew member of each vessel on the sea.

Referring to FIG. 3, when a vessel, that is, a reference vessel, detects a counterpart vessel having the possibility of a collision with the reference vessel, the vessel collision prevention apparatus 100 collects information about the position of the reference vessel via the mobile terminal 200 on the reference vessel at step S301. More particularly, when the reference vessel detects the counterpart vessel having the possibility of a collision with the reference vessel, the crew member of the reference vessel accesses the vessel collision prevention apparatus 100 using the mobile terminal 200. In response to the access, the vessel collision prevention apparatus 100 checks information about the position of the reference vessel, for example, the position and speed of the reference vessel, based on the GPS information of the mobile terminal 200.

The vessel collision prevention apparatus 100 receives information about the counterpart vessel from the crew member of the reference vessel via the mobile terminal 200 within the reference vessel at step S302. Here, the counterpart vessel corresponds to a vessel having the possibility of a collision with the reference vessel.

Referring to FIG. 4, if an identification device capable of identifying the counterpart vessel, for example, a radar or an automatic vessel identification device, is mounted on the reference vessel, the user of the mobile terminal 200 may obtain information about the counterpart vessel using the identification device, and input the obtained information to the vessel collision prevention apparatus 100 via the mobile terminal 200. If the identification device is not mounted on the reference vessel, the user of the mobile terminal 200 may input information about the counterpart vessel, determined by the naked eye, to the vessel collision prevention apparatus 100 via the mobile terminal 200. Here, the information about the counterpart vessel includes the position of the counterpart vessel (i.e., a relative position), the distance to the counterpart vessel, the speed of the counterpart vessel, and the size of the counterpart vessel.

The vessel collision prevention apparatus 100 compares the information about the position of the counterpart vessel collected at step S302, with the information about the position of the counterpart vessel collected by a server at step S303.

If, as a result of the comparison, the information about the position of the counterpart vessel input by the reference vessel is identical with information about the position of the counterpart vessel collected by the server, the vessel collision prevention apparatus 100 incorporates the information about the position of the counterpart vessel collected by the server, at steps subsequent to step S304.

Thereafter, the vessel collision prevention apparatus 100 extracts a point where a collision is expected, that is, an expected collision point, based on the information about the position of the reference vessel and the information about the position of the counterpart vessel and then calculates an expected collision route based on the expected collision point at step S305. Here, the vessel collision prevention apparatus 100 calculates the possibility of a collision occurring between the reference vessel and the counterpart vessel, that is, the possibility of a collision, based on the expected collision route.

Referring to FIG. 5, the vessel collision prevention apparatus 100 may provide the calculated expected collision route to the user via the mobile terminal 200. For example, the ranks of the reference vessel and the counterpart vessel pursuant to navigation regulations are included in a screen of the mobile terminal 200, that is, a marine chart. Furthermore, the position and navigational status of each vessel are displayed on the marine chart, and the position where a collision is expected and time when the collision is expected are displayed as predicted values on the marine chart.

If the possibility of a collision corresponding to the expected collision route calculated at step S305 is above a set value, the vessel collision prevention apparatus 100 calculates an escape route capable of preventing the collision between the vessels at step S306. Here, the vessel collision prevention apparatus 100 determines whether the reference vessel is a give-way vessel that must perform an escape operation or a stand-on vessel that must maintain a course and speed pursuant to the Sea Traffic Safety Act or the International Regulations for Avoiding Collisions at Sea, and then calculates an escape route based on the results of the determination.

Referring to FIG. 6, if there is the possibility of a collision corresponding to the expected collision route calculated at step S305 and the reference vessel is a give-way vessel that must give way based on the role and rank of the reference vessel, the vessel collision prevention apparatus 100 may provide the reference vessel with a veered route capable of performing cooperative escape via the mobile terminal 200.

Thereafter, the vessel collision prevention apparatus 100 transfers a message, warning of the possibility of a collision, to both the vessels (i.e., the give-way vessel and the stand-on vessel) or the mobile terminal 200 corresponding to a vessel that must play the role of the give-way vessel at step S307.

If the mobile terminals 200 of both the vessels (i.e., the give-way vessel and the stand-on vessel) having the possibility of a collision are accessed, the vessel collision prevention apparatus 100 transfers a message, warning of the possibility of a collision, to both the vessels or the reference vessel via both the mobile terminal 200 or one of them, and also transfers escape routes suitable for the roles of the vessels (i.e., the roles of the give-way vessel and the role of the stand-on vessel).

At step S308, the vessel collision prevention apparatus 100 checks whether changes in the route have been approved by both the vessels that have received the message warning of the possibility of a collision at step S307.

If, as a result of the checking, a change in route has not been approved by at least one of the two vessels, the vessel collision prevention apparatus 100 checks whether a vessel by which a change in route has not been approved is the give-way vessel or the stand-on vessel and calculates an alternative escape route capable of preventing a collision based on the results of the checking at step S309.

If, as a result of the checking, the changes in route have been approved by both vessels, the vessel collision prevention apparatus 100 transfers information about the changes in the route to mobile terminals corresponding to surrounding vessels located within a set radius around both the vessels at step S310.

The vessel collision prevention apparatus 100 compares the change in the actual position of a specific vessel, that is, an actually measured position, with the escape route before the specific vessel passes through the expected collision point at step S311.

If, as a result of the comparison, the change in the actually measured position is different from the escape route, the vessel collision prevention apparatus 100 determines that the specific vessel has deviated from the escape route and transfers an off-route message, informing that the specific vessel has deviated from the escape route, to the mobile terminal of the specific vessel at step S312.

If, as a result of the comparison, the change in the actually measured position is identical with the escape route, the vessel collision prevention apparatus 100 continues to check the possibility of a collision before the specific vessel passes through the expected collision point at step S313. If there is the possibility of a collision, the vessel collision prevention apparatus 100 calculates an alternative escape route capable of preventing the collision, as at step S609.

The vessel collision prevention apparatus 100 continues to monitor the reference vessel until the reference vessel passes through the expected collision point at step S314, and continues to provide a warning message, warning of a collision between the vessels, to the user via the mobile terminal before the specific vessel passes through the expected collision point at step S315. When the specific vessel passes through the expected collision point, the vessel collision prevention apparatus 100 terminates the overall process.

As described above, the apparatus and method for preventing a collision between vessels according to the embodiments of the present invention are capable of preventing a collision between vessels by predicting the possibility of a collision without requiring special navigation equipment within a vessel.

Furthermore, in order to prevent a collision between vessels resulting from the misjudgment that the counterpart vessel will change its route, cooperative escape operations are planned based on the roles of respective vessels pursuant to navigation regulations, and the vessels continue to be monitored and given notification so that the vessels can perform the cooperative escape operations actively. As a result, a collision between vessels can be effectively prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preventing a collision between vessels, comprising:
  collecting information about a position of a reference vessel using a mobile terminal on the reference vessel;
  receiving information about a counterpart vessel from a user on the reference vessel via the mobile terminal;
  calculating an expected collision route based on the information about the position of the reference vessel and the information about the counterpart vessel;
  calculating escape routes capable of preventing a collision between the vessels if a possibility of a collision corresponding to the expected collision route is above a set value;
  providing the escape routes via mobile terminals on the vessels and comparing changes in actually measured positions of the vessels with the escape routes;
  managing navigation of the vessels based on results of the comparison between the changes in the actually measured positions of the vessels and the escape routes;
  determining whether at least one of the vessels provided with the escape route is a give-way vessel or a stand-on vessel if a change in route is not approved by the at least one of the vessels; and
  calculating an alternative escape route, replacing the escape route, based on results of the determination.

2. The method as set forth in claim 1, wherein the calculating the expected collision route comprises:
  extracting an expected collision point where the collision is expected to occur based on the information about the position of the reference vessel and the information about the position of the counterpart vessel; and
  calculating the expected collision routes based on the expected collision point.

3. The method as set forth in claim 1, wherein the receiving the information about the counterpart vessel comprises:
  obtaining the information about the counterpart vessel using an identification device of the reference vessel capable of identifying the counterpart vessel; and receiving the obtained information from the user on the reference vessel via the mobile terminal.

4. The method as set forth in claim 1, wherein the information about the counterpart vessel comprises at least one of a position of the counterpart vessel, a distance to the counterpart vessel, a speed of the counterpart vessel, and a size of the counterpart vessel.

5. The method as set forth in claim 1, wherein the calculating the escape routes comprises:
   determining whether the reference vessel is a give-way vessel that must perform an escape operation or a stand-on vessel that must maintain a course and speed pursuant to a predetermined rule; and
   calculating the escape routes based on results of the determination.

6. An apparatus for preventing a collision between vessels, comprising:
   a position information processing unit for collecting information about a position of a reference vessel using a mobile terminal on the reference vessel and receiving information about a counterpart vessel from a user on the reference vessel via the mobile terminal;
   an expected collision route calculation unit for calculating an expected collision route based on the information about the position of the reference vessel and the information about the counterpart vessel;
   an escape route calculation unit for calculating escape routes capable of preventing a collision between the vessels if a possibility of a collision corresponding to the expected collision route is above a set value; and
   a control unit for providing the escape routes via mobile terminals on the vessels, comparing changes in actually measured positions of the vessels with the escape routes, and managing navigation of the vessels based on results of the comparison between changes in the actually measured positions of the vessels and the escape routes;
   wherein the escape route calculation unit determines whether the at least one vessel is a give-way vessel or a stand-on vessel, and calculates an alternative escape route, replacing the escape route, based on results of the determination if a change in route is not approved by at least one of the vessels provided with the escape routes.

7. The vessel collision prevention apparatus as set forth in claim 6, wherein the expected collision route calculation unit extracts an expected collision point where the collision is expected based on the information about the position of the reference vessel and the information about the position of the counterpart vessel, and calculates the expected collision route based on the expected collision point if the information about the position of the reference vessel is identical with the information about the counterpart vessel.

8. The vessel collision prevention apparatus as set forth in claim 6, wherein the position information processing unit receives the information about the counterpart vessel from the user on the reference vessel via the mobile terminal, the information obtained by using an identification device located on the reference vessel.

9. The vessel collision prevention apparatus as set forth in claim 6, wherein the information about the counterpart vessel comprises at least one of a position of the counterpart vessel, a distance to the counterpart vessel, a speed of the counterpart vessel, and a size of the counterpart vessel.

10. The vessel collision prevention apparatus as set forth in claim 6, wherein the escape route calculation unit determines whether the reference vessel is a give-way vessel that must perform an escape operation or a stand-on vessel that must maintain a course and speed pursuant to a predetermined rule, and calculates the escape routes based on results of the determination.

* * * * *